United States Patent
Schliwa-Bertling et al.

(10) Patent No.: US 11,523,444 B2
(45) Date of Patent: Dec. 6, 2022

(54) UE HANDLING IN RAN

(71) Applicant: Telefonaktiebolaget LM Ericsson (publ), Stockholm (SE)

(72) Inventors: Paul Schliwa-Bertling, Ljungsbro (SE); Magnus Stattin, Upplands Väsby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 268 days.

(21) Appl. No.: 16/609,348

(22) PCT Filed: May 3, 2018

(86) PCT No.: PCT/SE2018/050454
§ 371 (c)(1),
(2) Date: Oct. 29, 2019

(87) PCT Pub. No.: WO2018/203813
PCT Pub. Date: Nov. 8, 2018

(65) Prior Publication Data
US 2020/0077454 A1    Mar. 5, 2020

Related U.S. Application Data (60) Provisional application No. 62/501,026, filed on May 3, 2017.

(51) Int. Cl.
*H04W 76/11* (2018.01)
*H04W 48/18* (2009.01)
(Continued)

(52) U.S. Cl.
CPC ............ *H04W 76/11* (2018.02); *H04W 48/18* (2013.01); *H04W 60/005* (2013.01);
(Continued)

(58) Field of Classification Search
CPC ... H04W 76/11; H04W 48/18; H04W 60/005; H04W 88/08; H04W 12/108; H04W 8/24; H04W 8/26; H04W 8/06; H04W 60/00
See application file for complete search history.

(56) References Cited

U.S. PATENT DOCUMENTS

| 6,760,752 B1 * | 7/2004 | Liu ..................... H04L 63/0435 |
| 2005/0216568 A1 * | 9/2005 | Walkush ............. G06Q 10/107 |
| | | 709/207 |

(Continued)

FOREIGN PATENT DOCUMENTS

| CN | 101212810 A | 7/2008 |
| CN | 101998320 A | 3/2011 |

(Continued)

OTHER PUBLICATIONS

First Chinese Office Action for Chinese Patent Application No. CN 201880027897.3 dated May 27, 2021, 12 pages (including English translation).

(Continued)

*Primary Examiner* — Thinh D Tran
(74) *Attorney, Agent, or Firm* — Sage Patent Group (57) ABSTRACT

Techniques for generating and maintaining an identifier (112) of a user equipment (UE) (102) are presented. For instance, the disclosure presents an example method (200) executed by a radio access network (RAN) node for providing a UE (102) with an identifier (112). This example method (200) can include, for example, generating the identifier (112) for the UE (102), where the identifier (112) includes RAN node identity information, a timestamp indicating a time at which the identifier is generated by the RAN node (106), and/or integrity information from which the identifier (112) is verifiable. In addition, the example method (200) can include adding the identifier (112) to an information container (110) corresponding to the UE (102) and (Continued)

forwarding the information container (110) including the identifier (112) to a core network node (108). Related RAN node (106) and core network node (108) devices are also presented, as well as example computer programs, systems, and techniques for generating and maintaining an identifier (112) for a UE (102).

13 Claims, 7 Drawing Sheets (51) Int. Cl.
*H04W 60/00* (2009.01)
*H04W 88/08* (2009.01)
*H04W 8/26* (2009.01)
*H04W 12/108* (2021.01)

(52) U.S. Cl.
CPC .............. *H04W 88/08* (2013.01); *H04W 8/26* (2013.01); *H04W 12/108* (2021.01)

(56) References Cited

U.S. PATENT DOCUMENTS

| | | | | |
|---|---|---|---|---|
| 2009/0316604 | A1* | 12/2009 | Singh | H04W 76/11 370/254 |
| 2012/0020346 | A1* | 1/2012 | Ganapathy | H04W 36/10 370/338 |
| 2014/0046906 | A1* | 2/2014 | Patiejunas | G06F 21/6209 707/661 |
| 2016/0295406 | A1* | 10/2016 | Agiwal | H04W 12/041 |
| 2016/0337127 | A1* | 11/2016 | Schultz | H04L 9/3268 |
| 2018/0220364 | A1* | 8/2018 | Li | H04W 12/041 |
| 2019/0141524 | A1* | 5/2019 | Wang | H04W 12/06 |

FOREIGN PATENT DOCUMENTS

| | | |
|---|---|---|
| CN | 102067707 A | 5/2011 |
| CN | 102257852 A | 11/2011 |
| CN | 102405667 A | 4/2012 |
| CN | 104869659 A | 8/2015 |
| EP | 2298017 B1 | 11/2011 |
| WO | 2008152611 A1 | 12/2008 |
| WO | 2010008856 A1 | 1/2010 |
| WO | 2013109857 A1 | 7/2013 |

OTHER PUBLICATIONS

Barton, Bart, "LTE attach procedure", LTE, 4G, EPC, MME, PGW, SGW, Interfaces and beyond tech-blog, Jan. 28, 2012, 8 pages.
Unknown, Author, "3rd Generation Partnership Project; Technical Specification Group Radio Access Network; Evolved Universal Terrestrial Radio Access (E-UTRA) Radio Resource Control (RRC); Protocol specification (Release 8) the present", 3GPP TS 36.331 V8.5.0, Mar. 2009, pp. 1-204.
Unknown, Author, "3rd Generation Partnership Project; Technical Specification Group Radio Access Network; Evolved Universal Terrestrial Radio Access (E-UTRA); Radio Resource Control (RRC); Protocol specification (Release 14)", 3GPP TS 36.331 V14.2.0, Mar. 2017, pp. 1-189.
Unknown, Author, "3rd Generation Partnership Project; Technical Specification Group Radio Access Network; Evolved Universal Terrestrial Radio Access (E-UTRA); User Equipment (UE) radio transmission and reception (Release 14)", 3GPP TS 36.101 V14.2.1, Jan. 2017, pp. 1-25.
Unknown, Author, "3rd Generation Partnership Project; Technical Specification Group Radio Access Network; Evolved Universal Terrestrial Radio Access (E-UTRA); User Equipment (UE) radio transmission and reception (Release 15)", 3GPP TS 36.101 V15.2.0, Mar. 2018, pp. 1-1625.
Unknown, Author, "3rd Generation Partnership Project; Technical Specification Group Radio Access Network; Evolved Universal Terrestrial Radio Access Network (E-UTRAN); S1 Application Protocol (S1AP) (Release 14)", 3GPP TS 36.413 V14.2.0, Mar. 2017, pp. 1-342.
Unknown, Author, "BNSDOCID: <XP~ _ 14266442A_I_> LTE; Evolved Universal Terrestrial Radio Access Network (E-UTRAN); Architecture description 3GPP TS 36.401 version 13.0.0 Release 13", ETSI TS 136 401 V13.0.0, Jan. 1, 2016, pp. 1-12.
First Examination Report dated Feb. 12, 2021 for Indian Patent Application No. 201947043662, 5 pages.

* cited by examiner

UE HANDLING IN RAN

CROSS-REFERENCE TO PRIORITY APPLICATION

The present application claims priority to U.S. Provisional Patent Application No. 62/501,026, filed May 3, 2017, and entitled "UE Handling in RAN," the entirety of which is incorporated herein by reference.

TECHNICAL FIELD

The present disclosure generally relates to wireless communication systems, and specifically relates to handling and identifying a user equipment (UE) in a communication network.

BACKGROUND

In current wireless communication systems, a connected UE is identifiable to a Radio Access Network (RAN) based on a temporary identity. This temporary identity of the UE is controlled and managed by the core network (CN) such as a Mobility Management Entity (MME) according to existing Non-Access Stratum (NAS) protocols. In particular, this temporary identity (e.g., Global UE Temporary Identity (GUTI)) is assigned and updated to other values by the core network at time instances and/or events configured in the core network. Although the RAN receives a part of the GUTI called the System Architecture Evolution (SAE)-Temporary Mobile Subscriber Identity (S-TMSI), the process of re-assigning a new temporary identity by the core network to the UE is transparent to RAN. Accordingly, in some instances, the core network changes a UE identity without the RAN being informed of such a change, which results in an identifier conflict for the same UE between the RAN and the core network.

Thus, improved techniques for generating and maintaining a uniform and verifiable UE identifier are needed in wireless communication systems.

SUMMARY

The present disclosure describes techniques for generating and maintaining a UE identifier, which may be referred to in some embodiments described below as Secure Special Identifying Information (SSII). In some examples, the SSII may be introduced into the existing information (e.g., information specified by communication standards promulgated by the Third Generation Partnership Project (3GPP)) that is not currently used in some wireless communication systems. As will be further described herein, the information contained in SSII can include, for example, the timestamp when the SSII is created, information about the RAN node (i.e., an eNodeB (eNB) or other RAN device, module, or component) where the SSII was created, and/or security information enabling integrity protection of the SSII and used to validate the SSII, for instance, by other RAN or core network nodes.

Accordingly, the present disclosure presents example embodiments that include one or more methods, devices, computer programs, processors/processing circuits, and memory for providing an identifier for one or more UEs in a wireless communication system. For instance, the present disclosure presents a method executed by a RAN node for providing a UE with an identifier that can include, in some examples, generating the identifier for the UE, where the identifier includes RAN node identity information, a timestamp indicating a time at which the identifier is generated by the RAN node, and/or integrity information from which the identifier is verifiable. In addition, the example method can also include adding the identifier to an information container corresponding to the UE. Furthermore, the example method can include forwarding the information container including the identifier to a core network node.

In addition, example embodiments described herein include a further example method executed by a core network node, which includes receiving, from a RAN node, an information container containing an identifier of a UE. In addition, the example method can include determining that the UE is to be served by a different core network than the core network corresponding to the core network node. Additionally, the method can include forwarding at least the identifier to a core network node of the different core network.

Furthermore, the present disclosure presents an example RAN node configured to generate the identifier for the UE, wherein the identifier includes RAN node identity information, a timestamp indicating a time at which the identifier is generated by the RAN node, and/or integrity information from which the identifier is verifiable. The example RAN node is further configured to add the identifier to an information container corresponding to the UE and to forward the information container including the identifier to a core network node.

Moreover, the example embodiments presented by the present disclosure include a core network node configured to receive, from a RAN node, an information container containing an identifier of a UE. In addition, the example RAN node can be configured to determine that the UE is to be served by a different core network than the core network corresponding to the core network node. Additionally, the example RAN can be configured to forward at least the identifier to a core network node of the different core network.

In a further aspect, the present disclosure describes an example RAN node that includes a processor (or a plurality of processors) and a memory (or a plurality of memories) storing computer executable code that when executed by the processor(s) causes the RAN node to generate the identifier for the UE, where the identifier includes RAN node identity information, a timestamp indicating a time at which the identifier is generated by the RAN node, and/or integrity information from which the identifier is verifiable. In addition, the memory can store computer executable code that when executed by the processor(s) causes the example RAN node to add the identifier to an information container corresponding to the UE and to forward the information container including the identifier to a core network node.

Furthermore, the present disclosure includes an example core network node that includes one or more processors and a memory (or a plurality of memories) storing computer executable code that when executed by the processor(s) causes the core network node to receive, from a RAN node, an information container containing an identifier of a UE. In addition, the memory can store computer executable code that when executed by the processor(s) causes the core network node to determine that the UE is to be served by a different core network than the core network corresponding to the core network node and to forward at least the identifier to a core network node of the different core network.

In a further aspect, the disclosure below presents an example computer program made up of instructions which, when executed by at least one processor of a RAN node, causes the RAN node to generate the identifier for the UE, wherein the identifier includes RAN node identity information, a timestamp indicating a time at which the identifier is generated by the RAN node, and/or integrity information from which the identifier is verifiable. In addition, the example computer program can include instructions which, when executed by at least one processor the RAN node, causes the RAN node to add the identifier to an information container corresponding to the UE and to forward the information container including the identifier to a core network node.

Furthermore, the present disclosure describes an example computer program made up of instructions which, when executed by at least one processor of a core network node, causes the core network node to receive, from a RAN node, an information container containing an identifier of a UE, to determine that the UE is to be served by a different core network than the core network corresponding to the core network node, and to forward at least the identifier to a core network node of the different core network.

In addition, as one of ordinary skill in the art would understand, the above-recited example embodiments and their related features are not limiting and can include any of the example features further explained below, as well as any features and/or techniques known to one of ordinary skill in the art.

DETAILED DESCRIPTION

The present disclosure describes techniques that allow networks (e.g., RAN and/or core networks) and devices/nodes associated with these networks to clearly identify individual UEs that are served by a network or associated node or other network-side device. Accordingly, these networks, their operators, and the devices comprising the networks can avoid confusion regarding the identity of particular UEs, including confusion regarding the different identities of unique UEs (e.g., in a same network or across networks) and/or confusion regarding the identity of a particular UE 102 over time and across different networks that may serve this particular UE 102. Aspects of example embodiments that implement such techniques will now be described in reference to the figures.

Figure 1:
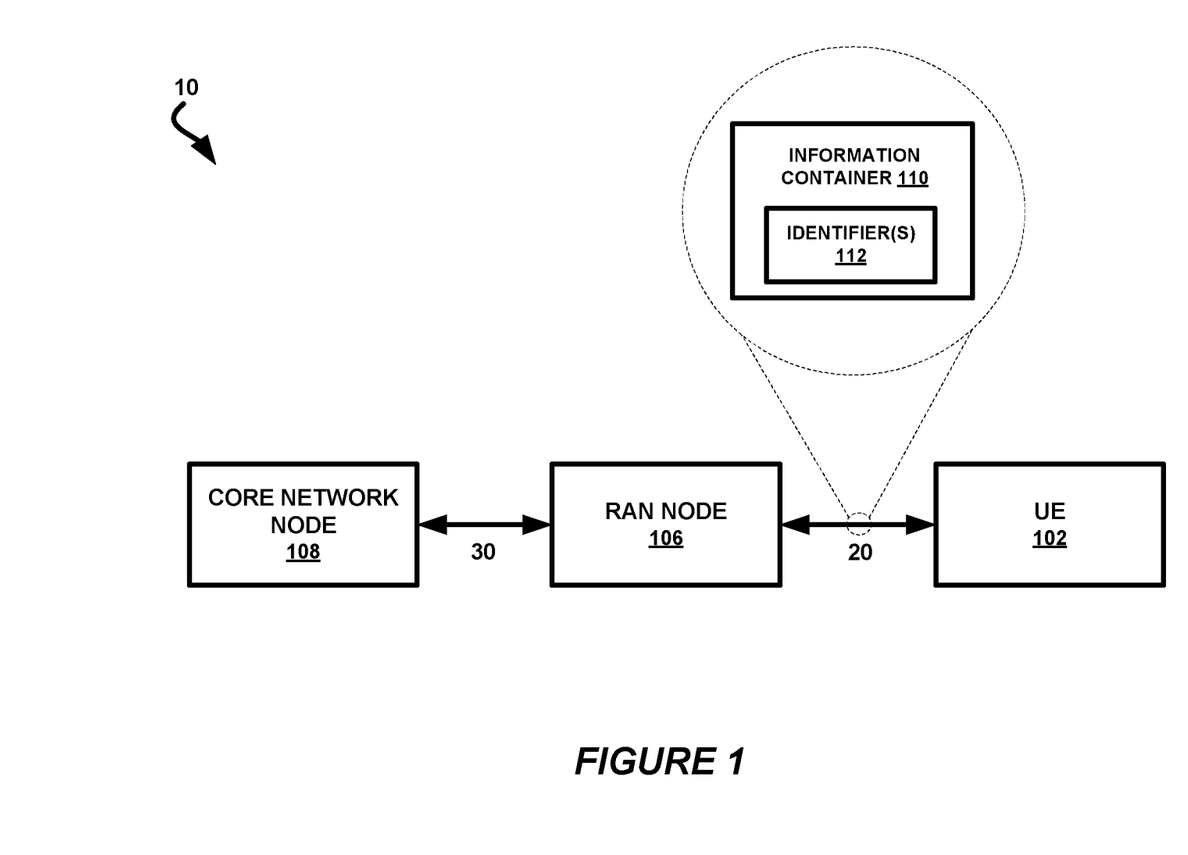
FIG. 1 is a block diagram of a wireless communication system according to one or more embodiments.

FIG. 1 illustrates a wireless communication system that includes a RAN node 106 (such as, but not limited to, a base station, eNB, etc), in communication with one or more UEs 102 (also referred to herein as a "terminal, "user terminal," or the like) and a core network node (e.g., a mobility management (MME)). The communication 20 between the RAN node 106 and the one or more UEs 102, in addition to uplink and downlink transmission of user/application data, may include uplink control signaling and downlink control signaling (also referred to as control information). In addition, the communication 20 may include one or more requests for, or one or more responses to such requests for, an information container 110 to which an identifier for the UE generated by the RAN node 106 may be added.

As introduced above, the system 10 may include a core network node 108 associated with a core network that is in communication with a RAN associated with the RAN node 106 and communicates user and control data toward (and from) the RAN and the UE over communication 30. The core network node 108 may be configured to provide an information container 110 (such as a data packet containing one or more information elements (IEs), such as those required by one or more standards promulgated by 3GPP) to the RAN node 106. The information container can include within it one or more identifiers 112 for a particular UE 102 or multiple UEs 102. The identifier 112 for the UE 102 may also be referred to herein as Secure Special Identifying Information (SSII).

In an aspect, the RAN node 106 may introduce the identifier 112 of the UE 102 into certain information containers 110 (e.g., data packets, packet headers, and the like) that in some cases may be specified by, and/or required by, 3GPP specifications. Furthermore, in some instances, the identifier 112 of the UE 102 can be introduced into the information container(s) 110 by utilizing particular information fields within these information containers 110. These information fields can, for example, include one or more information elements (IEs) in the information container(s) 110 created for, or otherwise designated for, housing an identifier 112 of a UE 102 that would otherwise go unused, thereby minimizing associated communication overhead in the system 10.

In certain embodiments, the identifier 112 of the UE 102 can be explicitly included within the information container 110, such as, but not limited to: information about the RAN and/or a particular RAN node, a timestamp indicating a time at which the identifier 112 was created and/or when the UE 102 associated with an identifier was served by a core network, core network node 108, a RAN, and/or RAN node, and/or security information enabling integrity protection for the identifier 112, etc.).

Additionally or alternatively, such information (including an identifier 112) may be accounted for or considered implicitly, and therefore need not necessarily be explicitly included in a particular information container 110. In other words, for purposes of the present disclosure, for an information container 110 to "contain" or "include" an identifier 112 for a UE 102 can mean that an identifier 112 is wholly or partially implied from the information container 110 and the information therein. As such, some information that is not explicitly indicated in an information container 110 can nevertheless form all or part of an identifier of a UE 110 because this inexplicit information can be considered implicitly by virtue of an association or correlation between the particular UE 102 and said information container 110 (or particular information therein). Accordingly, in an aspect of example embodiments provided herein, information associated with a particular UE 102 (that constitute and/or compliment the identifier 112 of the UE 102) in an information container 110 can be limited to information necessary to meet one or more particular objectives, for example, to confidently count the number of individual UEs. At the same time, other auxiliary information that may assist in identification of a UE 102, UE counting, etc., may be implicit and therefore not explicitly included in the identifier 112 of the UE 102 and/or the information container 110.

In instances where the UE 102 is in Idle Mode, a time at which the identifier 112 (e.g., SSII) is introduced and/or the device/location where the SSII was introduced can be stored at the core network node 108 (e.g., Mobility Management Entity (MME)) as per existing 3GPP specifications. In an additional aspect, when the UE 102 transitions into Connected Mode, certain UE-specific information (e.g., information specified or required by 3GPP specifications) can be sent to the RAN node 106 and can be directed, for example, to one or more processes handling that particular UE 102. This aspect can utilize, for instance, UE-associated signaling over the S1AP interface in the S1AP Initial UE Context Setup Request message.

In a further aspect, at a change of the core network serving nodes from core network node 108 to a core network node of a different core network (e.g., at mobility- or load-rebalancing-driven-CN change), the UE-specific information can be transferred from the previous serving core network node 108 to the new serving core network using the existing UE Context transfer procedure. For that purpose and in context of embodiments where the system 10 is an Evolved Packet System (EPS), one or more embodiments may utilize the UE Radio Capability Information Element (e.g., as specified in 3GPP TS 36.413v14.2.0, section 9.2.1.27).

In an alternative or additional aspect, a Radio Resource Control (RRC) UE Capability IE (e.g., UE-Evolved Universal Mobile Telecommunications System (UMTS) Terrestrial Radio Access-Capability or UE-Capability-Narrow Band (NB), see 3GPP TS 36.331 v14.2.1). For purposes of the present disclosure, although the RAC IE may be specifically used for an example, any information container 110 (such as a data packet, packet data unit, or any other data set comprising one or more bits) may also be used, and as such instances of "RAC IE," "UE RAC IE," or the like can be replaced with "information container" or "information carrier," generally.

By utilizing the techniques introduced above, devices and networks in system 10 can avoid confusion regarding the identity of particular UEs 102, even when those UEs 102 move between RANs. Accordingly, core networks and RANs can unambiguously identify UEs 102 (whether in Idle or Connected Mode) and therefore can confidently count the number of individual UEs 102 making use of a particular RAN (in a particular time window, for instance).

Figure 2A:
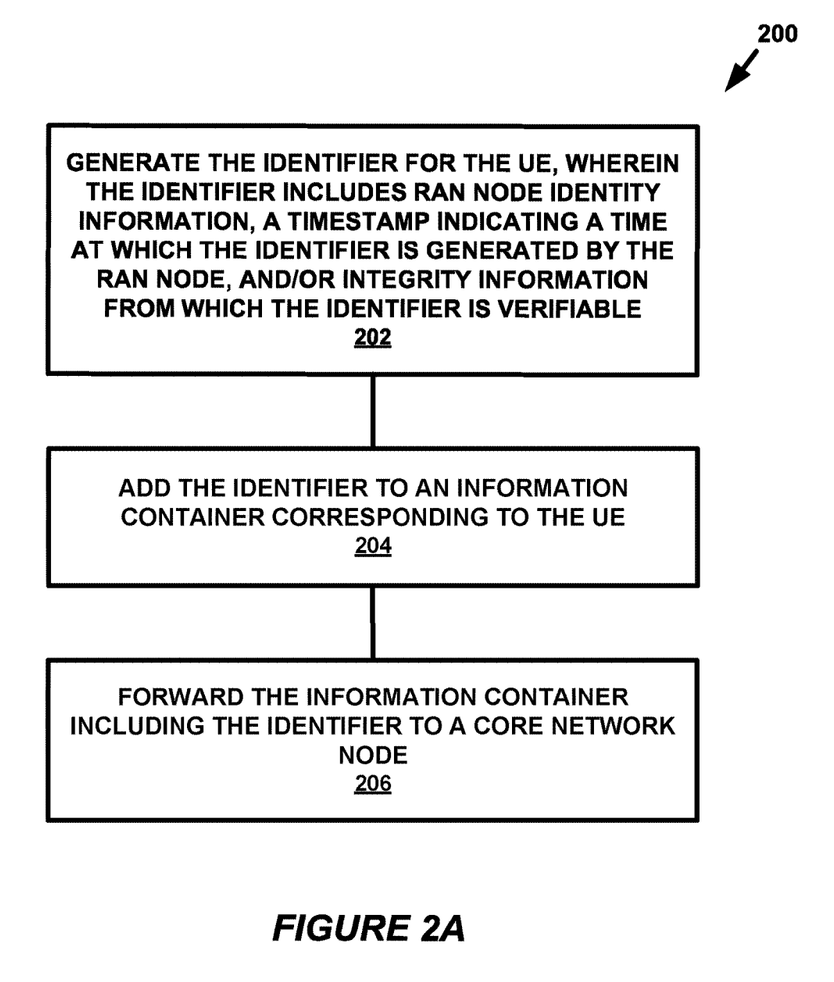
FIG. 2A is a logical flow diagram illustrating a method performed by a RAN node according to one or more embodiments.

FIG. 2A illustrates a flow diagram of a method 200 that may be performed by a RAN node 106 according to the embodiments described herein. For instance, method 200 can provide a UE 102 with a UE identifier 112 that can be included in an information container 110, in some examples. In an aspect, at block 202, method 200 may include the RAN node 106 generating the identifier for the UE 102, where the identifier includes RAN node identity information, a timestamp indicating a time at which the identifier is generated by the RAN node, and/or integrity information from which the identifier is verifiable. In addition, at block 204, method 200 may include the RAN node 106 adding the identifier 112 to an information container 110 corresponding to the UE 12. Furthermore, at block 206, method 200 may include the RAN node 106 forwarding the information container 110 including the identifier 112 to a core network node 108. Again, as introduced above in reference to FIG. 1, though the identifier 112 can be generated and explicitly added to an information container 110 (e.g., a discrete, alphanumeric indicator placed in one or more information elements), blocks 202, 204, and 206 could also comprise generating and adding information other than an explicit UE indicator 112 to the information container such that the indicator 112 can be implied from the information container 110. This optional aspect is not only true with respect to FIG. 2A, but also can be a feature of any of the example methods described herein, including those that follow in FIGS. 2B, 2C, and 2D.

Although not explicitly shown in FIG. 2A, method 200 may include additional aspects, such as those described below. For instance, method 200 may include determining that the information container 110 is not available and obtaining the information container 110 from the UE 102. In some embodiments, method 200 may include determining that the information container 110 containing a prospective identifier is available and determining that the prospective identifier is not within a valid time window. This valid time window may be preconfigured and/or may be dynamic and provided by/obtained from any of the core network, an operator, an RAN node, a UE, or any other device or entity associated with system 10 of FIG. 1. In some examples, method 200 may include determining that the information container 110 is available but does not contain a prospective identifier. Method 200 may also include generating the timestamp (for example, based on a clock or maintained time at the RAN node 106 or obtained from another device/entity). In some examples of method 200, generating the identifier for the UE is responsive to activation of a wireless connection between the UE and the RAN node.

Figure 2B:
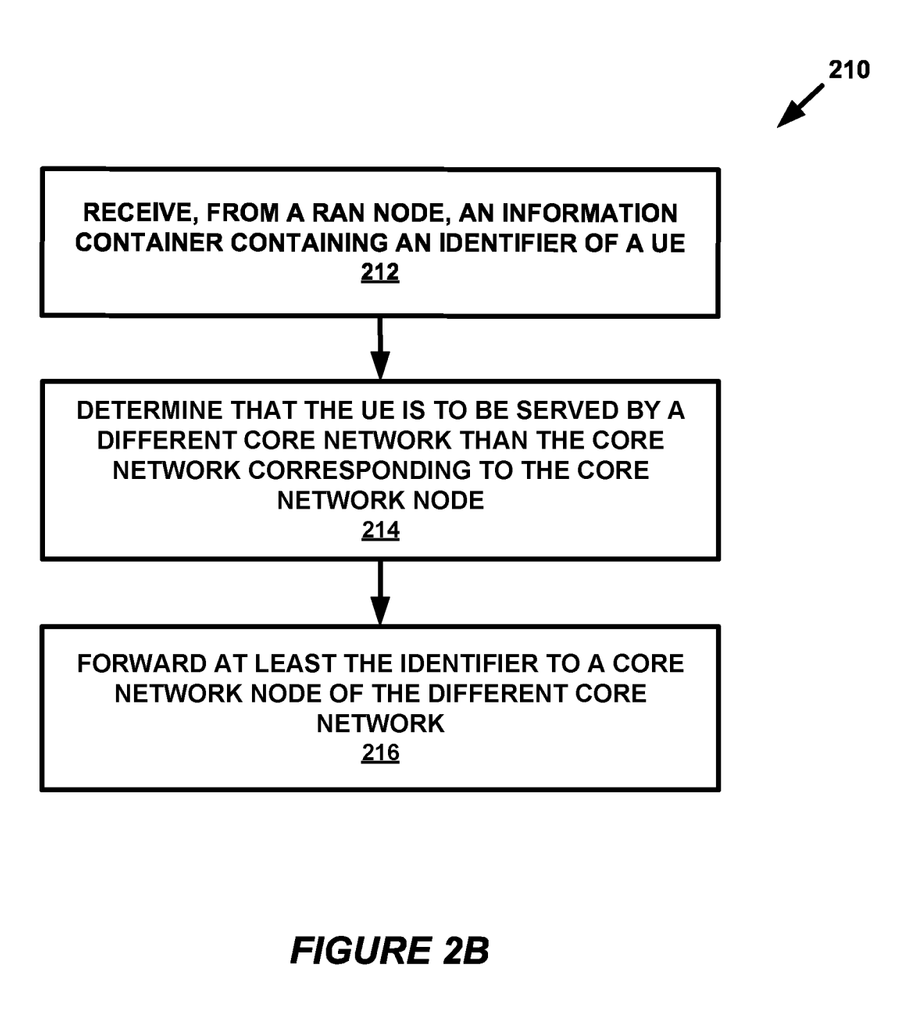
FIG. 2B is a logical flow diagram illustrating a method performed by a core network node according to one or more embodiments.

FIG. 2B illustrates a flow diagram of a method 210 that may be performed by a core network node 108 according to the embodiments described herein. For instance, method 210 may include, at block 212, receiving, from a RAN node, an information container 110 containing an identifier of a UE. Method 210 may also include, at block 214, determining that the UE 102 is to be served by a different core network than the core network corresponding to the core network node 108. Furthermore, method 210 may include, at block 216, forwarding at least the identifier 112 to a core network node of the different core network.

In addition, some features that may be included in either or both of methods 200 of FIG. 2A and method 210 of FIG. 2B may include the following. For instance, in either method, the core network node 108 may be a Mobility Management Entity (MME). Additionally, in either method, the information container 110 may include or may be a Radio Access Capability Information Element, an RRC UE Capability Information Element, an UE-EUTRA-Capability Information Element, and/or a UE-Capability-NB Information Element. In addition, although not stated explicitly in FIG. 2A or FIG. 2B or the related description of these figures, certain aspects of method 220 of FIG. 2C and/or method 240 of FIG. 2D may also be included in some examples of the methods 200 and/or 300. These methods 220 and 240 will now be described fully in reference to FIGS. 2C and 2D, respectively.

Figure 2C:
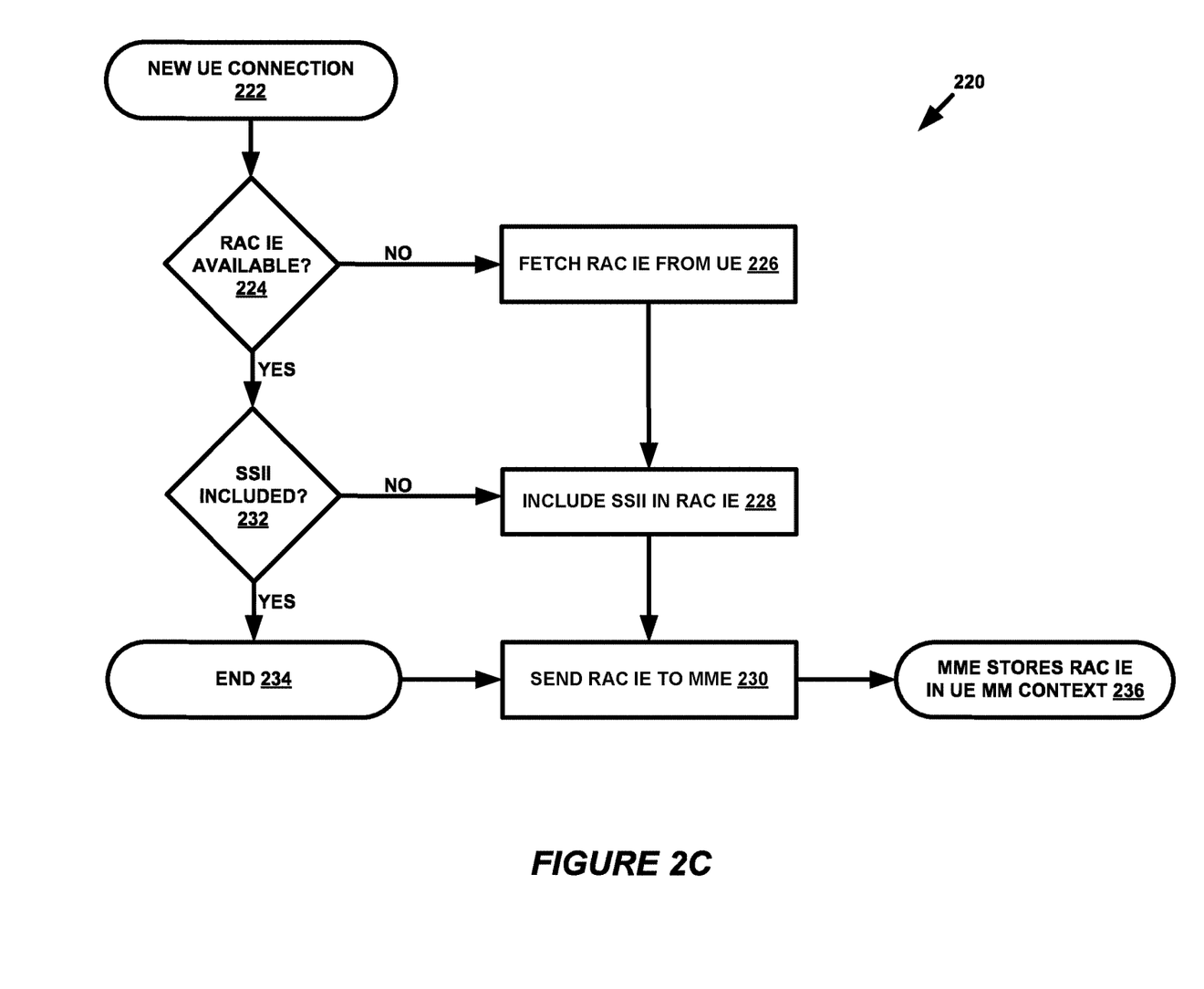
FIG. 2C is a logical flow diagram illustrating a method performed by a RAN node according to one or more embodiments.
Figure 2D:
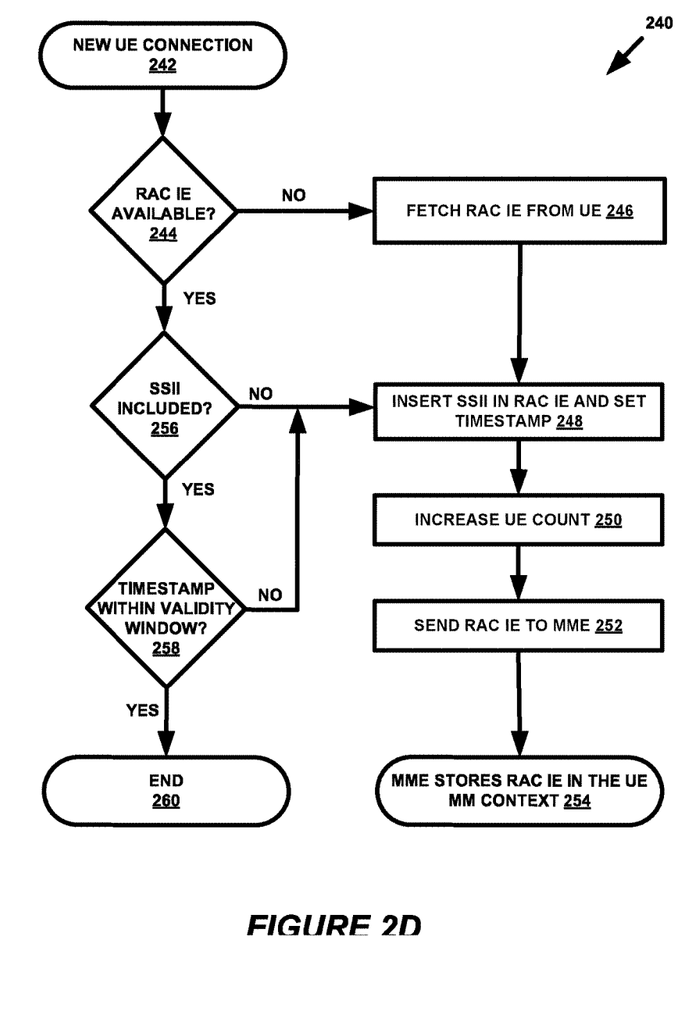
FIG. 2D is a logical flow diagram illustrating a method performed by a RAN node according to one or more embodiments.

FIGS. 2C and 2D lay out certain aspects performed by the RAN node 106 of the present disclosure, and by import, complimentary actions of the UE 102 and core network node 108 that are at least implied as being performed by those devices in accordance with the aspects of those figures. Turning first to method 220 of FIG. 2C, the method shows one example of how the RAN node 106 can add an identifier 112 (herein referred to as that SSII) into an information container 110 (referred to as the UE RAC IE or simply RAC IE for purposes of at least FIGS. 2C and 2D). As shown, the RAN node 106 can first establish/set up a new connection with a UE 102 at block 222. Next, at block 224, the RAN node 106 (e.g., eNodeB) can determine whether the RAC IE is available, or in other words, whether the RAC IE was received from a core network node 108 such as an MME during a UE context setup procedure or handover procedure.

If the RAN node 106 determines that the RAC IE is not available at the RAN node 106, the method 220 proceeds to block 226, where the RAN node 106 (or other RAN device) triggers a procedure to retrieve the RAC IE from the UE 102. Once received from the UE 102, the RAN node 106 stores the retrieved RAC IE (and/or any associated packet or information container) at the RAN node 106. Continuing on to block 228, the RAN node 106 inserts the SSII into the RAC IE retrieved and stored at block 226. Once inserted, the RAN node 106 sends the RAC IE to the MME (i.e., core network node 108), where it is stored in the mobility management context for the UE 102.

Alternatively, if at block 224 the RAN node 106 determines that the RAC IE is available at the RAN node 106, then the method 220 moves to block 232, where the RAN node 106 determines whether the SSII is available at the RAN node 106. If not, method 220 again continues on to block 228, where the RAN node 106 inserts the SSII into the RAC IE. Once inserted, the RAN node 106 sends the RAC IE to the MME (i.e., core network node 108), where it is again stored in the mobility management context for the UE 102. If, however, a valid SSII is available at block 232, the procedure ends.

FIG. 2D presents a method 240 that is similar to method 220 of FIG. 2C, but adds certain aspects, including some related to counting the one or more UEs 102 served by a RAN associated with the RAN node 106 and/or the RAN node 106 itself, for instance, within a particular time window (also referred to herein as the validity window, validity time window, or the like). As in method 220 of FIG. 2C, the RAN node 106 can first establish/set up a new connection with a UE 102 at block 242. At block 244, the RAN node 106 (e.g., eNodeB) can, as in method 220, determine whether the RAC IE is available (e.g., whether the RAC IE was received from a core network node 108 such as an MME during a UE context setup procedure or handover procedure).

If the RAN node 106 determines that the RAC IE is not available at the RAN node 106 at block 244, the method 240 proceeds to block 246, where the RAN node 106 (or other RAN device) triggers a procedure to fetch/retrieve the RAC IE from the UE 102. Once fetched/received from the UE 102, the RAN node 106 stores the retrieved RAC IE (and/or any associated packet or information container 110) at the RAN node 106 and inserts the SSII (or other UE identifier 112) into the retrieved and stored RAC IE at block 248. After the SSII is included in the RAC IE at block 248, the RAN node 106 can generate or otherwise set a timestamp indicating a moment in time where the SSII is generated/set and/or inserted into the RAC IE at block 248. Next, the RAN node can increase a UE count (i.e., for the RAN associated with the RAN node 106 and/or the RAN node 106 itself) at block 250. Continuing in method 240 to block 252, the RAN node 106 can send the RAC IE to the MME (i.e., core network node 108) where it is stored in the mobility management context for the UE 102 at block 254.

If, however, at block 244 the RAN node 106 determines that the RAC IE is available at the RAN node 106, then the method 220 moves to block 256, where the RAN node 106 determines whether the SSII for the subject UE 102 is available at the RAN node 106. If not, method 240 again continues on to block 248, where the RAN node 106 inserts the SSII into the RAC IE and generates/sets the timestamp for the SSII being included in the RAC IE. Again, once inserted, the RAN node 106 increases the UE count at block 250, sends the RAC IE to the MME (i.e., core network node 108) at block 252, where it is again stored in the mobility management context for the UE 102 at block 254.

On the other hand, where the RAN node 106 determines that a valid SSII is available at block 236, method 240 continues to block 258, where the RAN node 106 determines whether the timestamp associated with the SSII is within a validity time window. If the timestamp is within the validity time window, then the UE is already counted, and the procedure ends. However, if the SSII is not within the validity time window based on the determination at block 258, the method 240 proceeds to perform blocks 248, 250, 252, and 254 as explained above.

In addition to the aspects presented above in reference to methods 220 and 240 of FIGS. 2C and 2D, as well as the aspects described above in relation to methods 200 and 210 of FIGS. 2A and 2B, the additional or alternative aspects described below can be included in any of the embodiments introduced above. For instance, in an aspect, information included in the identifier 112 (also referred to in a non-limiting fashion as the SSII above) may include information about the RAN node 106 where the identifier 112 was created, and therefore may identify one or more of an individual RAN node, a group of RAN nodes, a part of a RAN, a RAN, or a vendor, though another device or network may be identified (e.g., a core network or core network node 108 such as an MME, for example). Additionally, counting of UEs 102 based on identifiers 112 can be done with different granularity in different embodiments or contexts, as well.

Furthermore, security information enabling integrity protection of the identifier 112 may also be generated by a RAN node 106 (and/or a core network node 108 or UE 102) in the process of performing, for instance, methods 220 and/or 240 of FIGS. 2C and/or 2D above. In such instances, this security information can include one or more of a checksum, message authentication code, and/or signature (or any other form of integrity protection known in the art, generally). Likewise, the checksum, message authentication code, and/or signature may be cryptographically computed (or can be generated via any other means of information, data, or identifier/ID validation known in the art, generally).

In some embodiments, such as but not limited to block 228 of FIG. 2C and/or block 248 of FIG. 2D, the SSII can be inserted or encoded in previously unused or invalid capability signaling IEs or in capability signaling IEs that are incompatible with (or precluded by) limitations in functionality associated with a particular standards release (e.g., promulgated by 3GPP or any other standards body). As such, the SSII can be included in capability signaling that is not used or relevant in a specific network or system of networks (i.e., when RAN node 106 and/or its associated RAN do not utilize functionality typically signaled in a particular information container 110 such as an RAC IE).

For example, in Release-13 and Release-14 of Long-Term Evolution (LTE) defined by standards promulgated by the 3GPP, Narrow-Band Internet-of-Things (NB-IoT) Time Division Duplex (TDD) operation is not supported. However, Radio Resource Control (RRC) UE capability signaling for NB-IoT supports signaling of values corresponding to TDD bands, and in some non-limiting examples, in IE UE-Capability-NB-r13→RF-Parameters-NB-r13→SupportedBandList-NB-r13→SupportedBand-NB-r13→FrequencyBandIndicator-NB-r13; as highlighted in the excerpt from 3GPP TS 36.331 v14.2.1.

Thus, a RAN node 106 such as an eNodeB that implements Release-13 and/or Release-14 may not serve or configure a Release-13 or Release-14 NB-IoT UE for operation in TDD bands. Therefore, in an embodiment where the RAN node 106 and/or one or more UEs 102 are configured for operation according to Release-13 or Release-14, any information containers 110, including IEs (such as, but not limited to, UE RAC IEs), reserved in system 10 to indicate NB-IoT-related operation can optionally be utilized to store and/or communicate an identifier 112 such as, but not limited to, an SSII according to example embodiments of the present disclosure.

In a particular non-limiting example that could be utilized, RRC UE capability signaling for NB-IoT supports signaling of values corresponding to TDD bands; more specifically, in some examples, the IE UE-Capability-NB-r13→RF-Parameters-NB-r13→SupportedBandList-NB-r13→SupportedBand-NB-r13→FrequencyBandIndicator-NB-r13, as described in 3GPP TS 36.331 v14.2.1, Sections 6.7.3.4 and 6.7.3.6, could be utilized to communicate an identifier 112 of a UE 102 such as an SSII. The IE FreqBand-Indicator-NB indicates the Evolved Universal Terrestrial Access Network (E-UTRA) operating band as defined in 3GPP TS 36.101 v15.2.0, Section 5.5, Table 5.5-1, for example, where band numbers 33-48 are TDD bands. The value range 33-48 consists of 16 values corresponding to 3 bits of information. Considering also the optional field powerClassNB-20 dBm-r13 (one bit encoded), 4 bits of auxiliary information can be encoded per SupportedBand entry with "TDD code points". As SupportedBandList-NB-r13 in this example can have up to 64 entries with five bits for each entry, 320 bits of information (64×4 bits) can be encoded in SupportedBandList-NB-r13. And if one takes a more conservative stance by assuming that the UE must indicate support for at least one band where it can operate, 315 bits (63×4 bits) could be assumed to be free to utilize for SSIIs.

In an alternative or additional example aspect, certain frequency bands may not be used with (or relevant to) a certain network or system of networks. In such examples, the identifier 112 of the UE 102 may be inserted/encoded in one or more SupportedBand entries with frequency band indicators corresponding to such frequency bands.

In another example aspect, an SSII or another type of identifier 112 for a UE 102 may similarly be encoded/inserted in supported frequency band and/or supported frequency band combination capabilities of one or more example information containers 110 (e.g., in LTE in supportedBandListEUTRA and/or sup portedBandCombination in RF-Parameters in UE-EUTRA-Capability see, e.g., 3GPP TS 36.331 V8.5.0, Section 6.3.6) In some scenarios it may be beneficial to separate the identifier 112 (e.g., SSII) from any RAC IE. Thus, in some embodiments, the identifier 112 may be inserted in or added to other IE/container 110 that can be stored, for example, in a core network node 108 or a new IE/container 110 to be defined in the furture and/or specified for the purpose of storing SSII in a RAN node 106 and/or core network node 08.

In addition, in a multi-vendor/multi-provider/multi-operator system 10 or wireless environment, the RAN node 106 and/or core network node 108 may be required to separately count UEs 102 served by each of multiple different available domains (e.g., different wireless service vendors/operators/service providers). Accordingly, the identifier 112 of the present disclosure is designed to support counting of UEs 102 of multiple domains, for instance, through separate identifier/SSII storage for different domains or through a multiple record structure in identifier/SSII with separate records for different domains. In such embodiments, different domains can then maintain individual SSII or use a common SSII structure with individual records for different domains.

To meet these ends, in some examples, multiple domains can be supported using one or more of the non-limiting techniques that follow. For example, a network device (e.g., RAN node 106, core network node 108, etc) and/or network operator can be configured to partition resources used for storing identifiers 112 of UE 102s to provide separate storage for different domains. In some examples, this is accomplished by partitioning band indicator code points and/or band numbers. In some embodiments, these network devices and/or network operators can utilize a parseable multi-record data format for separate storage of UE identifiers 112 based on network provider, for example. As a result, individual records can be identified, extracted, and/or parsed without the need to parse and/or decode the actual content of other records. Of course, as different providers have different/independent requirements and/or formats, the different records and the necessary information to obtain them may vary to an extent.

In some examples, new information and/or IEs may be introduced into existing specified 3GPP information that is stored in the core network node 108 while in IDLE mode for purposes of communicating and/or storing a UE identity. That information can be used by RAN to identify a specific UE.

Figure 3A:
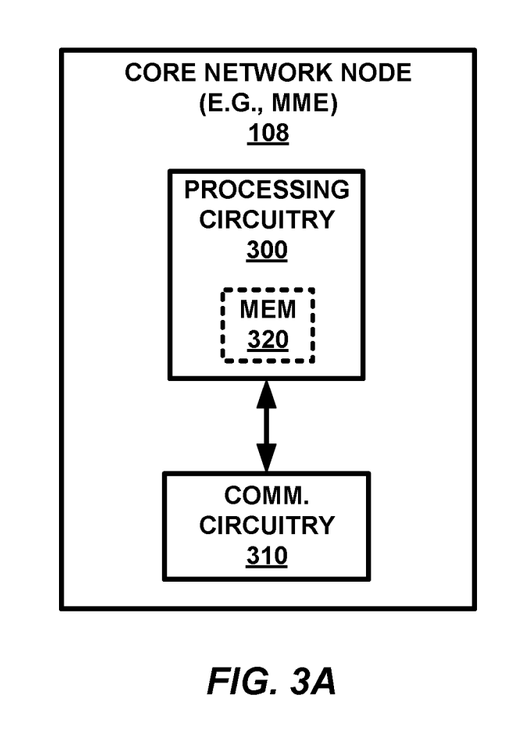
FIG. 3A is a block diagram of a core network node according to one or more embodiments.

FIG. 3A illustrates a core network node 108, such as a MME, implemented in accordance with one or more embodiments. As shown, the core network node 108 includes processing circuitry 300 and communication circuitry 310. The communication circuitry 310 is configured to transmit and/or receive information to and/or from one or more core network nodes of different core networks (i.e., during UE handover), to and/or from one or more RAN nodes 106, to and/or from one or more UEs 102 (i.e., via RAN) and/or one or more other nodes, devices, apparatuses, or the like, e.g., via any communication technology. Such communication may occur via one or more communication interfaces over one or more communication lines (wire, optical, bus, etc.) that are either internal or external to the core network node 108. The processing circuitry 300 is configured to perform processing described above, e.g., in FIG. 3, such as by executing instructions stored in memory 320. The processing circuitry 300 in this regard may implement certain functional means, units, or modules.

Figure 3B:
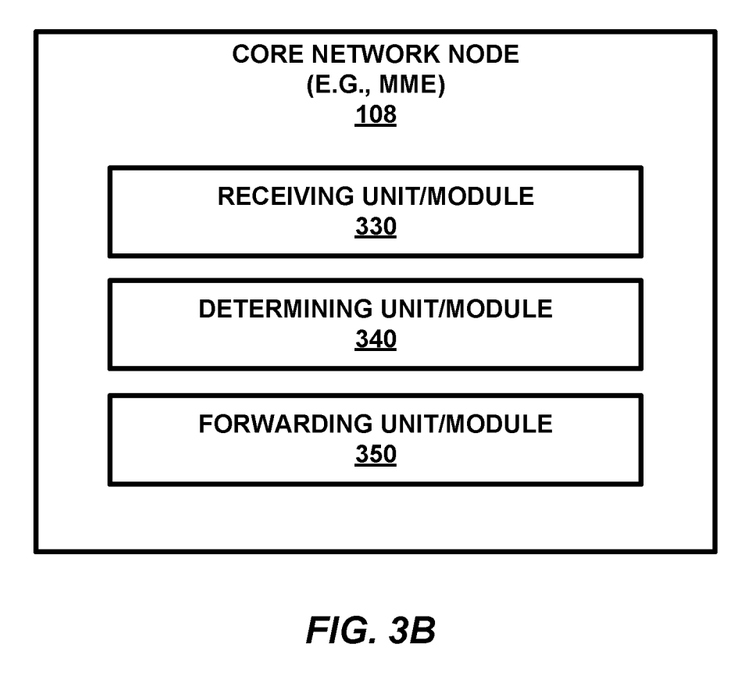
FIG. 3B is a block diagram of a core network node according to one or more other embodiments.

FIG. 3B illustrates a core network node 108 implemented in accordance with one or more other embodiments. As shown, the core network node 108 implements various functional means, units, or modules, e.g., via the processing circuitry 300 in FIG. 3A and/or via software code. These functional means, units, or modules, e.g., include for instance a receiving unit or module 330 for receiving, from a RAN node 106, an information container 110 containing an identifier 112 of a UE 102 (and related processing). Also included is a determining unit or module 340 for determining that the UE is to be served by a different core network than the core network corresponding to the core network node (and related processing). Further included is a forwarding unit or module 350 for forwarding at least the identifier to a core network node of the different core network (and related processing).

Figure 4A:
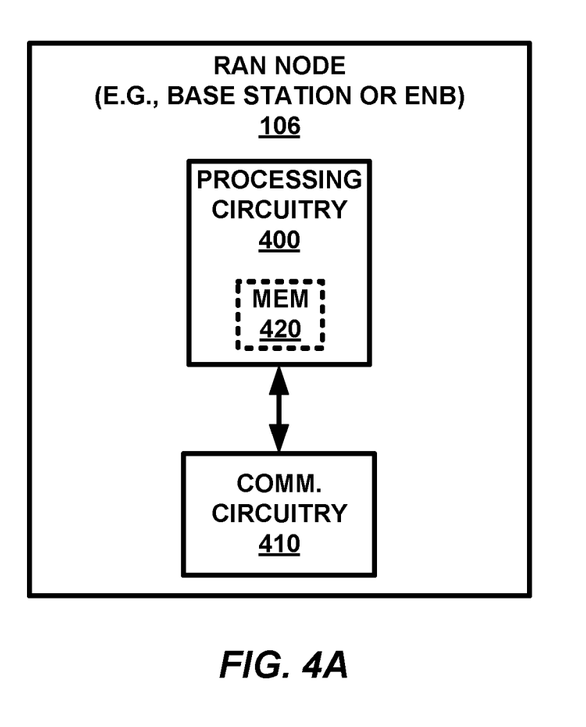
FIG. 4A is a block diagram of a RAN node according to one or more embodiments.

FIG. 4A illustrates a RAN node 106 implemented in accordance with one or more embodiments. As shown, the RAN node 106 includes processing circuitry 400 and communication circuitry 410. The communication circuitry 410 is configured to transmit and/or receive information to and/or from one or more other RAN nodes 106, to and/or from any UEs 102, to and/or from any core network nodes 108, and/or any other apparatuses, devices, modules, components, or the like of system 10 via wireless links and/or communication busses, and via any communication technology. Such communication may occur via one or more antennas and/or communication ports/interfaces that are either internal or external to the RAN node 106. The processing circuitry 400 is configured to perform processing described above, such as by executing instructions stored in memory 420. The processing circuitry 400 in this regard may implement certain functional means, units, or modules.

Figure 4B:
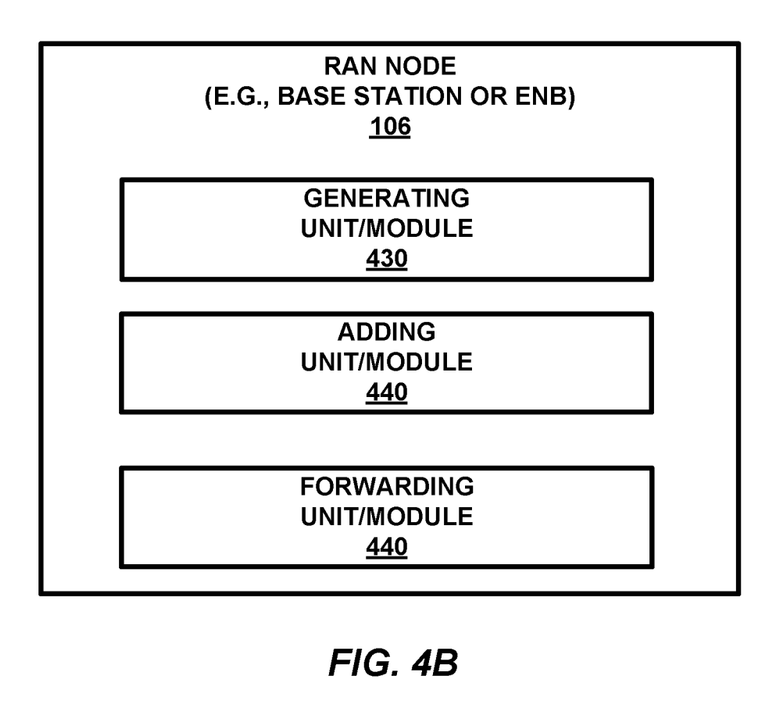
FIG. 4B is a block diagram of a RAN node according to one or more other embodiments.

FIG. 4B illustrates a RAN node 106 implemented in accordance with one or more other embodiments. As shown, the RAN node 106 implements various functional means, units, or modules, e.g., via the processing circuitry 400 in FIG. 4A and/or via software code. These functional means, units, or modules, e.g., for implementing the methods 200, 220, and 240 in FIGS. 2A, 2C, and 2D, respectively, include for instance a generating unit or module 430 for generating the identifier 112 for the UE 102, where the identifier 112 includes RAN node identity information, a timestamp indicating a time at which the identifier is generated by the RAN node, and/or integrity information from which the identifier is verifiable (and related processing). Also included is an adding unit or module 440 for adding the identifier to an information container corresponding to the UE (and related processing). Further included is a forwarding unit or module 450 for forwarding the information container including the identifier to a core network node (and related processing).

Those skilled in the art will also appreciate that embodiments herein further include corresponding computer programs. A computer program comprises instructions which, when executed on at least one processor of a node, cause the node to carry out any of the respective processing described above. A computer program in this regard may comprise one or more code modules corresponding to the means or units described above. Embodiments further include a carrier containing such a computer program. This carrier may comprise one of an electronic signal, optical signal, radio signal, or computer readable storage medium. In this regard, embodiments herein also include a computer program product stored on a non-transitory computer readable (storage or recording) medium and comprising instructions that, when executed by a processor of a network node or UE, cause the node or UE to perform as described above. Embodiments further include a computer program product comprising program code portions for performing the steps of any of the embodiments herein when the computer program product is executed by a computing device. This computer program product may be stored on a computer readable recording medium.

Furthermore, the processing or functionality of RAN node 106 may be considered as being performed by a single instance or device or may be divided across a plurality of instances of RAN node 106 that may be present in a given network/environment such that together the device instances perform all disclosed functionality. In addition, RAN node 106 may be any known type of device associated with a wireless communication network, radio communication network, or content delivery network, generally, that is known to perform a given disclosed processes or functions thereof. Examples of such network nodes include base stations, eNodeBs (eNBs), next generation nodeBs (gnBs), or other types of base stations for radio access network communication. Furthermore, core network node 108 can include one or more core network devices, such as, but not limited to, Mobility Management Entities (MMEs), gateways, servers, relays, and the like.

In any scenario discussed above, the UE 102 herein may be, or may be comprised of any wireless communication device that is able to communicate wirelessly with a wireless communication network, and may include, in some examples, mobile devices such as mobile phones, PDAs, tablets, computers (mobile or otherwise) laptops, or the like. In addition the UE 102 may comprise an Internet-of-Things device, e.g., a device that performs monitoring or measurements, and transmits the results of such monitoring measurements to another device or a network. Particular examples of such machines are power meters, industrial machinery, or home or personal appliances, e.g., refrigerators, televisions, personal wearables such as watches etc., In other scenarios, a wireless communication device as described herein may be comprised in a vehicle and may perform monitoring and/or reporting of the vehicle's operational status or other functions associated with the vehicle.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended example embodiments are intended to be embraced therein.

The invention claimed is:

1. A method executed by a Radio Access Network (RAN) node for providing a User Equipment (UE) with an identifier, the method comprising:
generating the identifier for the UE, wherein the identifier includes RAN node identity information, a timestamp indicating a time at which the identifier is generated by the RAN node, and integrity information from which the identifier is verifiable;
adding the identifier to an information container corresponding to the UE; and
forwarding the information container including the identifier to a core network node.

2. The method of claim 1, further comprising:
determining that the information container is not available; and obtaining the information container from the UE.

3. The method of claim 1, further comprising:
determining that the information container containing the identifier is available; and
determining that the identifier is not within a valid time window.

4. The method of claim 1, further comprising determining that the information container is available but does not contain the identifier.

5. The method of claim 1, further comprising generating the timestamp.

6. The method of claim 1, wherein generating the identifier for the UE is responsive to activation of a wireless connection between the UE and the RAN node.

7. A Radio Access Network (RAN) node configured to:
generate an identifier for a User Equipment (UE), wherein the identifier includes RAN node identity information, a timestamp indicating a time at which the identifier is generated by the RAN node, and integrity information from which the identifier is verifiable;
add the identifier to an information container corresponding to the UE; and
forward the information container including the identifier to a core network node.

8. The RAN node of claim 7, further configured to:
determine that the information container is not available; and
obtain the information container from the UE.

9. The RAN node of claim 7, further configured to:
determine that the information container containing the identifier is available; and
determine that the identifier is not within a valid time window.

10. The RAN node of claim 7, further configured to determine that the information container is available but does not contain the identifier.

11. The RAN node of claim 7, further configured to generate the timestamp.

12. The RAN node of claim 7, further configured to generate the identifier for the UE responsive to activation of a wireless connection between the UE and the RAN node.

13. The RAN node of claim 7, wherein the information container comprises a Radio Access Capability Information Element, a Radio Resource Control UE Capability Information Element, a UE-Evolved Universal Terrestrial Radio Access-Capability Information Element, and/or a UE-Capability-Narrow Band Information Element.

* * * * *